United States Patent Office 3,849,368
Patented Nov. 19, 1974

3,849,368
FIRE RETARDANT POLYMERS CONTAINING THERMALLY STABLE CYCLIC PHOSPHONATE ESTERS
James J. Anderson, Metuchen, Vasco G. Camacho, Iselin, and Robert E. Kinney, Lawrenceville, N.J., assignors to Mobil Oil Corporation
No Drawing. Original application Nov. 15, 1971, Ser. No. 199,022, now Patent No. 3,789,091. Divided and this application Aug. 17, 1973, Ser. No. 389,285
Int. Cl. C08f 45/58
U.S. Cl. 260—45.8 R                   7 Claims

ABSTRACT OF THE DISCLOSURE

Polymers containing flame retardant amounts of addition products of alkylhalogen-free esters of (1a) phosphorus acids, (1b) carboxylic acids, or (1c) sulfonic acids and (2) a bicyclic phosphite (1-alkyl-4-phospha-3,5,8-trioxabicyclo-[2,2,2-]-octane), said addition products having the following group:

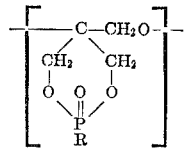

where
R is lower alkyl ($C_1$–$C_4$), preferably $C_1$–$C_2$, an hydroxalkyl ($C_1$–$C_4$), preferably $C_2$–$C_3$;
the addition products of (1a) or (1b) and (2); and preparation of the addition products by heating a mixture of (1a) or (1b) and (2) to an elevated temperature (e.g., 175–300° C.).

---

This is a division of application Ser. No. 199,022, filed Nov. 15, 1971, now U.S. 3,789,091.

This invention is concerned with novel cyclic phosphonate esters having high thermal stability prepared by reacting alkyl-halogen-free esters with a bicyclic phosphite. It is also concerned with fire retardant polymer compositions containing them.

With one exception, no literature references were found disclosing the chemical structure of the compounds of this invention or processes for preparing them. No references were found disclosing flame retardant compositions. U.S. Pat. No. 3,261,890 discloses a reaction between a triaryl phosphite and trialkyl phosphite or dialkyl alkyl phosphonate. The reaction disclosed is an ester interchange reaction and not the addition reaction of this invention. U.S. Pat. No. 2,852,549 discloses an ester interchange between two different trialkyl phosphates. Here again this reaction was not the addition reaction of this invention. U.S. Pat. No. 3,526,613 discloses a reaction between bicyclic phosphites and polycarboxylic acids. The patentees assign a structure to the products which appear to be similar to that of certain compounds of this invention. As is discussed hereinafter, however, the assigned structure does not appear to fit with analytical data on products of the patent prepared for comparative purposes. J. Chem. Soc. (C) 1970, p. 752–759 shows a reaction of methyl bicyclic phosphite with methyl toluene-p-sulfonate but has no disclosure of the utility of the addition product as a flame retardant.

This invention provides compounds set forth by the formulae:

(A) 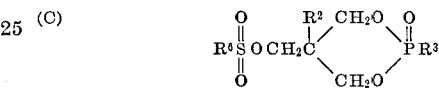

where $a$ is 0, 1 or 2; $b$ is 0, 1 or 2; $c$ is 1, 2, or 3 and $a+b+c$ is 3; R and R′ are the same or dissimilar and are alkyl, alkoxy, aryl, aryloxy, alkaryl, alkarylox, aralkyl, aryloxyalkoxy, or aralkoxy wherein the alkyl portion of these groups may contain hydroxyl but not halogen and the aryl portion may contain chlorine, bromine and hydroxyl groups; $R^2$ is alkyl, hydroxyalkyl, or aryl; $R^3$ is lower alkyl ($C_1$–$C_4$) or hydroxyalkyl ($C_1$–$C_4$) and (B) 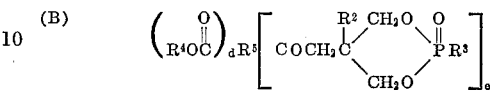

where $d$ is 0, 1 or 2; $e$ is 1, 2 or 3; $R^2$ is as defined above; $R^3$ is as defined above; $R^4$ is alkyl, aryl, alkaryl, aralkyl, or aryloxyalkyl, wherein the aryl portion may contain bromine, chlorine or hydroxyl; and $R^5$ is monovalent, divalent or tervalent alkyl, alkylene, aryl or arylene radical wherein the aryl or arylene radical may contain bromine, chlorine, alkyl or hydroxyl groups.

It also provides the process for preparing them and flame retardant polymer compositions containing flame retardant amounts of compounds of formulae (A), (B), or (C) 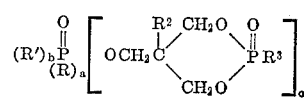

where $R^2$ and $R^3$ are same as defined above; and $R^6$ is alkyl, aryl, alkylaryl or arylalkyl wherein the aryl portion may contain bromine, chlorine or hydroxyl.

Compounds used in this invention are prepared by heating esters of phosphorus, carboxylic or sulfonic acid with bicyclic phosphites at temperatures of about 150 to 300° C. An equivalent reaction molar ratio of ester/phosphite of 1/1 is preferred, although ratios of 1/3 to 3/1 may be used. Where the ratio differs from 1/1, the excess reactant, if any, may be removed from the product by distillation. The time of reaction can vary widely, from about 5 minutes to about 7 days or more, dependent on the reactants involved, whether a catalyst is used, and on the temperature employed. Reactants can be charged into the reaction vessel at once or added separately in a stepwise or continuous manner or added simultaneously in a stepwise or continuous manner. Mixed bicyclic phosphites or mixed esters can also be employed.

When the ester boils above 200° C., the reaction is normally conducted at atmospheric pressure. Pressures above atmospheric are advantageous when low boiling esters are employed. Pressures above atmospheric can also be employed with high boiling ester.

Catalysts can be employed to reduce reaction temperatures or reaction times, although the reaction can be conducted in the absence of catalyst. Effective catalysts that can be employed are halogens, alkyl halides, alkyl arylsulfonates, amines, phosphorus acids, metal salts and metal esters. Preferred catalysts are iodine, bromine, methyl toluene sulfonate, ethylene dibromide, triethylamine, ethanolamine, methyl acid phosphate, stannous oxalate, stannous octoate, stannous chloride, stannic chloride and dibutyl tin dilaurate. Combination of catalyst may also be used. Catalyst levels of 0.1 to 1.0% (based on total weight of reactants) are preferred, but higher or lower concentrations may be employed.

Compounds of this inventio nmay be prepared in the presence of suitable solvents or dispersants; e.g., chlorinated aromatics such as dichlorobenzene. Similarly, compounds of invention may be used as a solvent or diluent in the preparation of other compounds of invention. Synthesis of compounds of invention within a given ploymer during polymer formation or polymer processing is also anticipated.

The preferred bicyclic phosphites utilizable to prepare products of this invention are as follows:

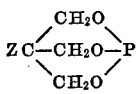

where Z is lower alkyl ($C_1$-$C_4$). It is contemplated that Z might also be alkaryl, aryl, aralkyl, haloaryl, aryloxyalkyl, haloaryloxyalkyl, hydroxyalkyl, and the like. Methyl and ethyl are preferred.

Other suitable bicyclic phosphites include structures such as:

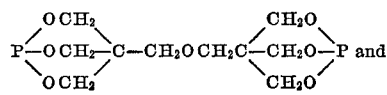 and

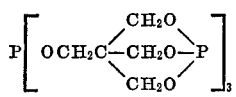

Phosphonate derivatives of these phosphites according to the basic process (monomeric addition) of this invention could be monomeric or polymeric depending on the nature of the ester and the molar ratio of reactants.

Suitable esters of phosphonic acids have the structure:

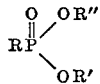

wherein R, R' and R''' are methyl, ethyl, propyl, butyl, octyl, phenyl, halophenyl, hydroxyphenyl, tolyl, xylyl, benzyl, phenethyl, hydroxyethyl, phenoxyethyl, dibromophenoxyethyl, with the proviso that either R' or R'' is methyl, ethyl, propyl, butyl or hydroxyalkyl ($C_1$-$C_4$). Preferred reactants or those where R' or R'' is methyl such as dimethyl methyl-, dimethyl phenyl-, O-methyl-O'-phenyl methyl- and dimethyl butyl phosphonate. Esters of diphosphonic acids, such as tetramethyl methylene diphosphonate, are also contemplated.

Suitable esters of phosphoric acids have the structure:

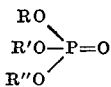

Operative examples are those where R, R' and R'' are same as defined for the phosphonic acids hereinabove with the proviso that at least one R, R' or R'' group is methyl, ethyl, propyl, butyl or hydroxyethyl. Preferred reactants are those where at least one of the R, R' or R'' group is methyl such as trimethyl, dimethyl phenyl, diphenyl methyl, methyl ethyl phenyl, and dimethyl 2,4-dibromophenyl phosphate.

Suitable esters of carboxylic acids have the structure:

where $n$ is 1–3 and Z is a monovalent radical such as methyl, ethyl, propyl, butyl, hexyl, phenyl, chlorophenyl, bromophenyl, dibromophenyl, tribromophenyl, hydroxyphenyl, naphthyl, tolyl, xylyl, benzyl, or phenethyl; or Z is a divalent radical such as methylene, ethylene, hexylene, vinylene, ortho phenylene, meta phenylene, para phenylene, tetrachlorophenylene (o, m or p), or tetrabromophenylene (o, m, or p); or Z is a trivalent radical such as phenenyl. Z may also be residues of other dicarboxylic acid esters such as

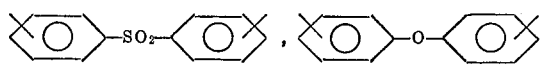

or

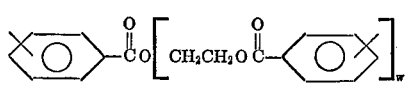

R is defined as for the phosphonic acids above with the proviso that when $n$ is one, R is methyl, ethyl or hydroxyethyl; similarly when $n$ is 2 or 3 at least one R must be methyl, ethyl, propyl, butyl or hydroxyalkyl ($C_1$-$C_4$). Preferred reactants include dimethyl terephthalate, dimethyl phthalate, dimethyl isophthalate, methyl o-bromobenzoate, methyl 2,4-dibromobenzoate, dimethyl maleate, dimethyl fumarate, dimethyl tetrachloroterephthalate, bis(2-hydroxyethyl)terephthalate, bis(2 - hydroxyethyl) polyethyleneterephthalate, dimethyl adipate, methyl salicylate, methyl o-chlorobenzoate and methyl 2,4-dibromobenzoate. Diesters of alkylene glycols such as ethylene glycol diacetate are also contemplated.

Suitable esters of sulfonic acid have the structure:

Operative samples are those where R is defined as for the phosphonic acids above and R' is methyl, ethyl, propyl, butyl and hydroxyalkyl ($C_1$-$C_4$). Preferred reactants are methyl and ethyl p-toluenesulfonates.

EXAMPLE I 33.2 g. (.025 mole) of bicyclic trimethylolpropane phosphite (1-ethyl-4-phospha-3,5,8-trioxabicyclo-[2,2,2]-octane), and 76.0 g. (.615 mole) of dimethyl methylphosphonate were charged into a 250 ml. flask equipped with stirrer, thermometer, heating mantle and condenser. The reaction was protected by a blanket of nitrogen.

The mixture was heated rapidly to 188° at which time refluxing was observed. Heating at reflux temperature of 188–198° C. was continued for 29.5 hours. Gas chromatographic analysis of the unstripped product showed the bicyclic phosphite had reacted completely. The product was stripped at 3 mm. to 160° C.

56.5 g. of a colorless viscous liquid was obtained having an acid number of 12.1 mg. KOH/g. The distillate, 47.2 g., was identified as dimethyl methylphosphonate by gas chromatographic analysis. The product yield was near quantitative for a 1:1 molar ratio of reaction between the phosphonate and phosphite. Gas chromatographic analysis of the product showed no unreacted starting materials and twin peaks corresponding to two high boiling materials with very close elution times.

NMR analysis of product was consistent with the structure below:

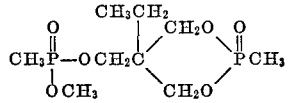

The twin peaks found by gas chromatographic analysis indicate the existence of cis-trans isomers.

EXAMPLE Ia 52.8 g. (0.325 mole) of bicyclic trimethylolpropane phosphite and 20.2 g. (0.163 mole) of dimethyl methylphosphonate were charged in a 200 ml. flask equipped with stirrer, condenser, thermometer and heating mantle. The reactor assembly was blanketed with nitrogen throughout the reaction. The mixture was heated to 90° C. with stirring during which time the solid bicyclic phosphite melted and a homogeneous liquid was produced. The reaction mixture was heated for 25 minutes after which a temperature of 200° C. was obtained and gentle reflux was noted. Heating was continued to maintain reflux for 2.5 hours during which time the pot temperature gradually increased to 230° C. The mixture was heated at 230–240° C. for an additional 9.5 hours.

Essentially quantitative yield of a light yellow, glassy solid was obtained on cooling. Gas chromatographic analysis of the final product showed no dimethyl methylphosphonate, traces of unreacted bicyclic phosphite and traces of the two isomers of Example I. An acid number of 21.9 was obtained.

EXAMPLE Ib 20.3 g. (0.125 mole) of bicyclic phosphite of Example I and 15.5 g. (0.125 mole) of dimethyl methylphosphonate were heated over a period of 8 hours at 189–240° C. Both gas chromatographic analysis and iodine titration showed no unreacted phosphite. 2.4 g. of unreacted dimethyl methylphosphonate were recovered on stripping to 160° C. at 3 mm. pressure. Gas chromatographic analysis and quantity of recovered dimethyl methylphosphonate showed the final product was a mixture containing approximately 85% of Example I and 15% of Example Ia.

EXAMPLE Ic 40.5 g. (0.25 mole) of bicyclic phosphite of Example I and 31.0 g. (0.25 mole) of trimethyl phosphite were heated to 133° C. where steady reflux of trimethyl phosphite was observed. After heating under reflux for one hour, gas chromatographic analysis showed no reaction had occurred. Iodine catalyst, 0.14 g., was added. On continued heating, the reflux temperature rose to 175° C. over a 1.7-hour period. GC analysis showed no reaction of bicyclic phosphite had occurred but 80–90% of the trimethyl phosphite had rearranged to dimethyl methylphosphonate.

Hearing was continued for about 3 hours at 170–240° C. The reaction product was essentially identical to the unstripped product mixture of Example Ib.

EXAMPLE Id 40.5 g. (0.25 mole) of bicyclic phosphite of Example I was charged into a reaction flask equipped with additional funnel, stirrer, reflux condenser and thermometer. The bicyclic phosphite was heated to 200° C. Eight ml. (0.06 mole) of trimethyl phosphite was added in 1–2 ml. portions over a two-hour period while maintaining a reaction temperature of 195–210° C. GC analysis showed approximately 50% conversion of trimethyl phosphite to dimethyl methylphosphonate. After heating the mixture for 40 minutes at 198–212° C., rearrangement of trimethyl phosphite to dimethyl methylphosphonate was essentially completed.

An additional 0.19 mole of trimethyl phosphite was added portionwise over a period of 6 hours at reaction temperatures of 220–225° C. GC analysis of product mixtures at interval times showed rearrangement of trimethyl phosphite to dimethyl methylphosphonate occurred readily which in turn reacted with the bicyclic phosphite. After three hours additional aging at 200–240° C., all of the bicyclic phosphite had reacted.

5.4 g. of dimethyl methylphosphonate was recovered on stripping to 150° C. at 11 mm. The final product was essentially identical to the product mixture of Example Ib. Product acidity was 11.3 mg. KOH/g.

EXAMPLE Ie

Dimethyl methylphosphonate was reacted with the bicyclic trimethylolethane phosphite, 1-methyl-4-phospha-3,5,8-trioxabicyclo-[2,2,2]octane, according to Example Ia. A light yellow, semi-solid product was obtained having an acid number of 12.3 mg. KOH/g. GC analysis showed no unreacted phosphite or phosphonate.

EXAMPLE If 49.8 g. (0.30 mole) of the bicyclic phosphite of Example I was heated with 24.9 g. (0.15 moles) of diethyl ethylphosphonate at 195–200° C. for 5 hours during which time little reaction took place. Iodine catalyst, 0.15 g., was added and the mixture was heated for an additional 7.5 hours during which time approximately 30% of the phosphite and phosphonate reacted. An additional 0.15 g. of iodine catalyst was added and heating was continued for 7 hours at 195–200° C., 15 hours at 215–220° C. and 33.5 hours at 235–240° C.

A near colorless, semi-solid product was obtained having an acid number of 27.6 mg. KOH/g. GC analysis showed all phosphonate reacted and approximately 10% unreacted bicyclic phosphite.

EXAMPLE Ig 28.2 g. (.173 mole) of the bicyclic phosphite of Example I, 21.7 g. (.086 mole) of dibutyl butylphosphonate and 0.25 g. of ethanolamine catalyst were heated for 10.5 hours at 195–206° C. during which time approximately 10% reaction proceeded. Iodine catalyst, 0.25 g., was added and heating was continued for an additional 32 hours at 195–205° C. GC analysis showed approximately 70% of the phosphite and 85% of the phosphonate had reacted. An acid number of 19.0 mg. KOH/gm. was found.

Heating was continued at 195°–205° C. for 21 hours and an amber, viscous liquid was obtained. GC analysis showed only trace of bicyclic phosphite and no phosphonate remained in product. Product acidity of 78.2 mg. KOH/gm. was found.

EXAMPLE Ih 125 g. (0.9 mole) of trimethyl phosphate was heated with 48.6 g. (0.30 mole) bicyclic phosphite of Example I for 4.5 hours at 202–208° C. GC analysis showed all bicyclic phosphite had reacted.

After heating for an additional 2 hours at 206–208° C., the product was stripped to 172° C. at 4 mm. pressure and 87.0 grams (0.54 mole) of trimethyl phosphate was recovered. The weight balance corresponds to a reaction ratio of approximately 1:1 between the phosphate and phosphite. The colorless, viscous liquid product contained no unreacted phosphite or phosphate and an acid number of 18.8 mg. KOH/g.

EXAMPLE Ii

Example Ih was repeated using 0.36 mole of bicyclic phosphite and 0.12 mole of trimethyl phosphate. After heating the mixture at 235–240° C. for 3 hours an amber, semi-solid product was obtained. Product acidity was 34.4 mg. KOH/g. GC analysis showed no unreacted phosphite or phosphate.

EXAMPLE Ij 59.7 (0.36 mole) of bicyclic phosphite of Example I and 21.7 g. (0.12 mole) of triethyl phosphate were heated for 6 hours at 230–240° C. GC analysis showed no phosphate and about 8% unreacted phosphite. Product acidity was 33.2 mg. KOH/g.

The colorless, semi-solid product was produced after an additional hour at 235–240° C. having an acid number of 67.5 mg. KOH/g. GC analysis of product showed no unreacted phosphite or phosphate.

EXAMPLE Ik 34.0 g. (0.21 mole) of the bicyclic phosphite of Example I and 52.8 g. (0.20 mole) of diphenyl methyl phosphate were heated to 215° C. at which point a rapid exotherm to 300° C. occurred over a two-minute period. The reaction was cooled to 235° C. in four minutes. GC showed most of the phosphite and phosphate had reacted. After an additional hour at 210–235° C., no unreacted phosphite and only a trace quantity of diphenyl methyl phosphate remained. Product acidity was 16.6 mg. KOH/g.

An additional hour at 235–238° C. effected no significant change in product except the acid number increased to 27.1 mg. KOH/g. The final product was an amber, viscous liquid.

The structures of the compounds described in Examples I to Ik are set forth in Table I.

TABLE I

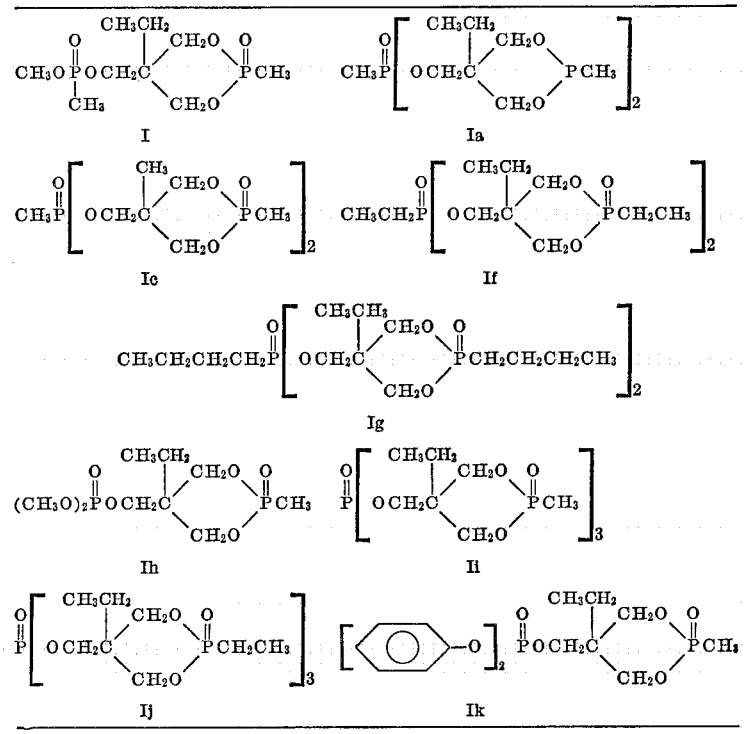

EXAMPLE II 32.4 g. (0.2 mole) of bicyclic phosphite of Example I and 116.4 g. (0.6 mole) of dimethyl terephthalate were heated at 240–270° C. for 13 hours. GC analysis showed all phosphite had reacted. Excess dimethyl terephthalate was removed by stripping to 156° C. at 5 mm. pressure.

The liquid product obtained solidified on cooling to a light tan solid having an acid number of 2.8 mg. KOH/g. GC analysis showed no unreacted phosphite or terephthalate. Twin product peaks were observed corresponding to two high boiling cis-trans isomers.

A portion of the solid was recrystallized twice from ethanol. A white crystalline solid was obtained having a melting point of 196.5–197.5° C. Elemental phosphorus analysis showed 8.57% compared to 8.69% theory.

EXAMPLE IIa 40.0 g. (0.246 mole) of bicyclic phosphite of Example I and 23.9 g. (0.123 mole) of dimethyl terephthalate were heated at 240–270° C. for 15.5 hours. On cooling, a near quantitative yield of light yellow, brittle glass was obtained having an acid number of 9.5 mg. KOH/g. GC analysis showed no unreacted phosphite or terephthalate, and only a trace of product of Example II.

NMR analysis of product was consistent with the structure below:

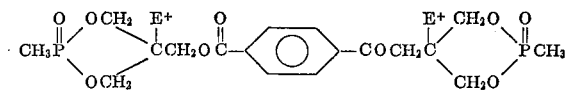

EXAMPLE IIb

The reaction of IIa was repeated using 0.5% (based on total weight) iodine catalyst. All phosphite and about 90% of the terephthalate reacted in 14.5 hours at 235–240° C. The light yellow, glassy product had an acid number of 7.9 mg. KOH/g.

EXAMPLE IIc 59.2 g. (0.4 mole) of bicyclic phosphite of Example Ie and 38.8 g. (0.2 mole) of dimethyl terephthalate were heated at 240–270° C. for about 6 hours and 270–318° C. for 2.3 hours. A dark yellow, brittle glass was obtained having an acid number of 20.8 mg. KOH/g. GC analysis showed no unreacted phosphite and trace of unreacted dimethyl terephthalate.

EXAMPLE IId 49.4 g. (0.30 mole) of bicyclic phosphite of Example I and 29.1 g. (0.15 mole) of dimethyl o-phthalate were heated at 235–240° C. for 34.5 hours. A golden brown, glassy solid was obtained having an acid number of 8.90 mg. KOH/g. GC analysis showed no unreacted o-phthalate and about 5% unreacted phosphite.

COMPARISON WITH EXAMPLE 6 OF U.S. 3,526,613

The product of Example 6 of U.S. 3,526,613 was prepared as described therein for comparative performance with an analogous compound of this invention (cf. Example IId). While the product characteristics as reported in the patent were confirmed, an acidity of 145 mg. KOH/g. was found. This high acid content indicates the reaction proceeded, in the main, by a different route than disclosed (=POH or =P(O)H is not titratable by alcoholic KOH). In addition, an analysis for the above group by iodine titration showed only 0.8% =P(O)H compared to 19.6 theory. These analyses indicate the cyclic phosphite ring was broken a second time by —COOH to produce a

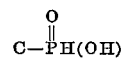

structure.

EXAMPLE IIe 49.4 g. (0.30 mole) of bicyclic phosphite of Example I and 21.6 g. (0.15 mole) of dimethyl maleate were heated for 18.5 hours at 200–240° C. The dark brown solid contained no titratable acid. GC analysis showed no unreacted starting materials.

EXAMPLE IIf 49.4 g. (0.30 mole) of bicyclic phosphite of Example I and 17.7 g. (0.15 mole) of dimethyl oxalate were heated at 195–200° C. for 15 hours. A brown, semi-solid product was obtained having no titratable acidity. GC analysis showed all oxalate had reacted and about 25% unreacted phosphite.

EXAMPLE IIg 39.5 g. (0.12 mole) of bicyclic phosphite of Example I and 39.8 g. (0.06 mole) of dimethyl tetrachloroterephthalate were heated at 235–240° C. for 10 hours. A black semi-solid was obtained having an acid number of 34.1 mg. KOH/g. GC analysis showed about 5% phosphite and 2% terephthalate remained unreacted.

EXAMPLE IIh 32.4 g. (0.2 mole) of the bicyclic phosphite of Example I and 25.5 g. (0.1 mole) of bis(2-hydroxyethyl)terephthalate were heated at 194–244° C. for 3.5 hours. The amber, semi-solid product contained no unreacted phosphite or terephthalate. Product acidity was 52.2 mg. KOH/g.

EXAMPLE IIi 48.6 g. (0.30 mole) of the bicyclic phosphite of Example I and 26.0 g. (0.15 mole) of dimethyl adipate were heated for 150 hours at 220–270° C. A brown, viscous, liquid product was obtained having an acid number of 41.6 mg. KOH/g. GC analysis of product showed no phosphite and only trace of adipate.

EXAMPLE IIj 33.2 g. (0.2 mole) of the bicyclic phosphite of Example I and 43.0 g. (0.2 mole) of methyl o-bromobenzoate were heated at 235–240° C. for 22 hours. GC analysis showed approximately 75% of the benzoate esters and 85% of the phosphite had reacted. Iodine catalyst, 0.075 g. was added and heating was continued for 7.5 hours at 235–240° C. A golden, viscous, liquid product was obtained having an acid number of 16.4 mg. KOH/g. GC analysis of final product showed no unreacted phosphite and approximately 28% unreacted bromobenzoate.

EXAMPLE IIk 16.5 g. (0.10 mole) of the bicyclic phosphite of Example I and 21.5 g. (0.10 mole) of methyl p-bromobenzoate were heated at 240–250° C. for 13 hours. A dark brown solid was obtained having an acid number of 10.6 mg. KOH/g. GC analysis showed approximately 97% phosphite and 67% methyl p-bromobenzoate had reacted.

EXAMPLE IIl 37.3 g. (0.23 mole) of the bicyclic phosphite of Example I and 39.3 (0.23 mole) of methyl o-chlorobenzoate were heated at 235–260° C. for 23.5 hours. An amber, viscous liquid was obtained having an acid number of 23.4 mg. KOH/g. GC analysis showed all bicyclic phosphite and approximately 68% methyl o-chlorobenzoate had reacted.

EXAMPLE IIm 34.5 g. (0.21 mole) of the bicyclic phosphite of Example I and 32.4 g. (0.21 mole) of methyl o-hydroxybenzoate were heated at 230–260° C. for 8.5 hours. An amber, solid product was obtained having an acid number of 1.4 mg. KOH/g. GC analysis showed only trace quantities of unreacted phosphite or methyl o-hydroxybenzoate. Infrared analysis showed the presence of a hydroxyl group in the product. The product was insoluble in water but soluble in 5% sodium hydroxide.

A portion of the crude solid was recrystallized from methanol. The white crystalline solid had a melting point of 173–175° C.

TABLE II

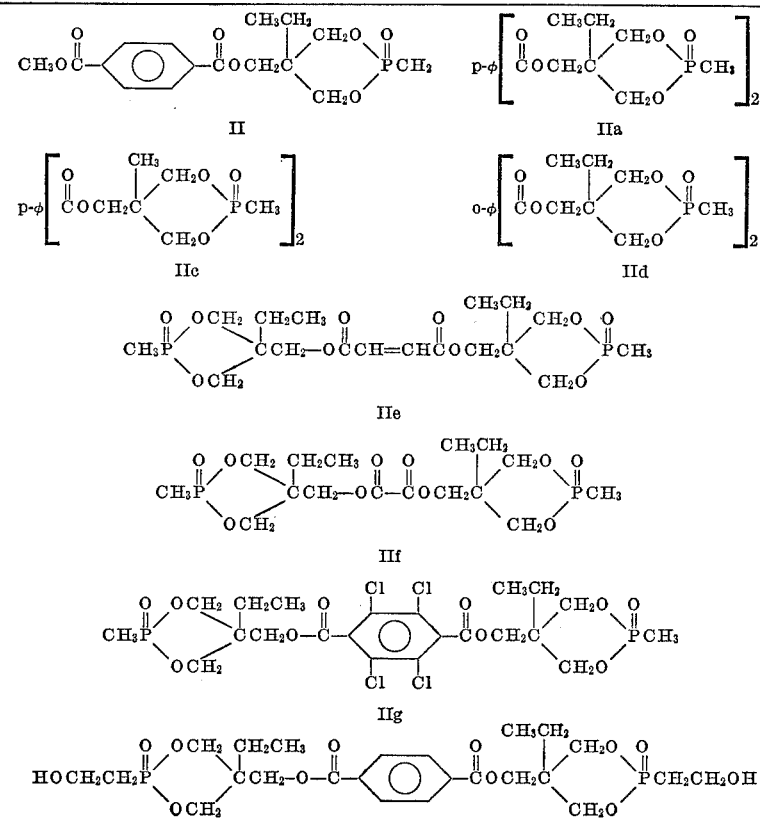

TABLE II—Continued

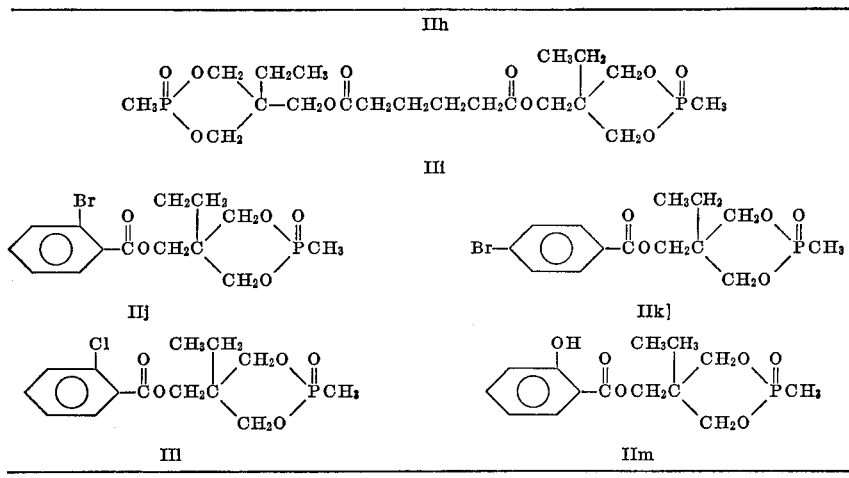

EXAMPLE III 32.4 g. (0.20 mole) of bicyclic phosphite of Example I was charged into a reaction flask and heated to 96° C. and 0.06 moles of methyl p-toluene sulfonate was added over a 2.5-hour period. After aging for 30 minutes at 95–100° C. about 30% of the sulfonate ester had reacted. The reaction temperature was raised to 145–150° C. and all of the sulfonate reacted in 30 minutes. An additional 0.14 mole of sulfonate was introduced portionwise over a 4.5-hour period at 145–150° C.

After two hours aging at 150–155° C. a light yellow viscous, liquid product was obtained with an acidity of 16.7 mg. KOH/g. GC analysis showed only traces of unreacted phosphite and sulfonate.

EXAMPLE IIIa 32.4 g. (0.20 mole) of bicyclic phosphite of Example 1 and 40.0 g. (0.20 mole) of ethyl p-toluene sulfonate was heated at 110–141° C. for 7.5 hours during which time about 20% reaction had occurred as determined by GC analysis. After heating for 10.5 additional hours at 145–160° C., a light yellow, viscous, liquid product was obtained having an acid number of 16.7 mg. KOH/g. GC analysis showed only trace of unreacted phosphite and about 10% unreacted sulfonate.

TABLE III

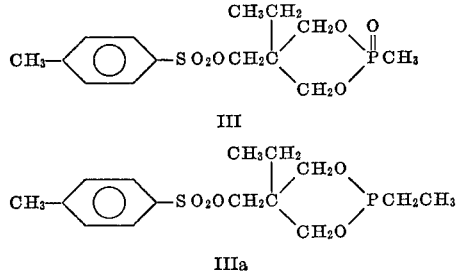

POLYMERIC COMPOSITIONS

The continuing evolution of new or more stringent flammability standards covering organic polymers in the form of fibers, films, coatings, castings, moldings, etc. imposes ever increasing demands on performance characteristics of the flame retardants for the polymer. Nylon and polyethylene-terephthalate, for example, are thermoformed into fibers, films, moldings, etc. at processing temperatures of 250–300° C. and higher. One of the more desirable methods of incorporating the flame retardant into these polymers is direct blending into the molten polymer either prior to or during the thermoforming operation such as extrusion.

These blending operations normally subject the flame retardant (in the presence of the polymer) to temperatures of 250–300° C. and higher for periods of fractional minutes to 30 minutes and longer. Obviously, the flame retardant must be themally stable, in itself, and in contact with the polymer during this exposure. Conversely, no significant breakdown of the polymer caused by chemical interaction or thermal decomposition of the flame retardant should occur. It should be understood, however, that some chemical interactions between the flame retardant and polymer may be desirable in some cases.

High flame retardant efficacy is generally required to minimize loadings to preserve the mechanical properties of the unmodified polymer. Most flammability standards covering textile applications require excellent retention of flame resistance after 10–50 laundry or dry cleaning cycles. Retention of flame resistance of polymers incorporating nonreactive flame retardants normally requires hydrolytically stable, nonmigrating and insoluble additives.

A new series of organophosphorus compounds of this invention meet the stringent performance requirements above. Structures of these compounds are set forth in the Summary of the Invention. The surprising high thermal stability of these structures may be due to the fact that the phosphorus is combined by (a) P—C linkages and (b)

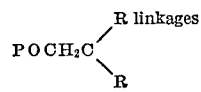

The absence of H atoms on the beta carbon in the latter structure apparently prevents rapid dealkylation reactions to form P—OH and olefins. Dealkylation reactions normally occur rapidly at 200–250° C. when the beta carbon contains a hydrogen.

EXAMPLE IV

Polyethylene terephthalate polyester (molecular weight about 20,000), flame retardant blends were prepared by rapidly heating polyester chips and flame retardant under 4–5 mm. vacuum to approximately 280–300° C. Stirring was continued for 5–15 minutes at 290–310° C. to produce a homogeneous melt. The hot melt was poured onto polytetrafluoroethylene coated foil and allowed to cool to room temperature. The brittle blend was finely ground into a free flowing powder.

Polyester flame retardant compositions prepared are tabulated below:

| Blend No. | Percent flame retardant agent | Remarks |
|---|---|---|
| IVa | 8% Ia | Blended for 5 minutes at 290-318° C. No evidence of decomposition as assessed by color. |
| IVb | 24% Ia | Blended for 5 minutes at 280-310° C. No evidence of decomposition as assessed by color. |
| IVc | 8% IIa | Blended for 5 minutes at 300-325°C. No evidence of decomposition as assessed by color. |
| IVd | 50% IIa | Blended for 5 minutes at 305-310° C. No evidence of decomposition as assessed by color. |
| IVe | 8% IId | Blended for 15 minutes at 305-310° C. No evidence of decomposition as assessed by color. |
| IVf | 8% compound 6 (U.S. 3,526,613) | Blended for 5 minutes at 300-305° C. Decomposition evident by brown color and acrid odor of hot melt. |

Thermogravimetric analysis of some of the polyester, flame retardant blends were determined. Weight loss of the blend was measured on heating at 10° C. per minute in a nitrogen atmosphere. The temperature at which 3, 10 and 50% weight losses occurred are shown below:

| Blend | Percent flame retardant agent | Temperature, °C. observed for percent weight loss of— | | |
|---|---|---|---|---|
| | | 3% | 10% | 50% |
| | None | 407 | 418 | 440 |
| IVa | 8% Ia | 385 | 410 | 445 |
| IVe | 8% IId | 375 | 410 | 440 |
| IVf | 8% compound 6 (U.S. 3,526,613) | 245 | 390 | 435 |

The data above shows the high thermal stability of compounds of invention. Weight losses at 300° C. and below are particularly significant since 300° C. is usually attained or approached in processing this polymer. Assuming the 3% loss is attributable solely to flame retardant, then approximately 38% of Compound 6 is lost at 245° C. compared to 375–385° C. for representative compounds of this invention. Weight losses owing to degradation of polymer or flame retardant would normally have an even greater deleterious effect on polymer properties.

Pressed sheets were prepared from the melt blends by compression molding at 575° F. press temperature and 0.07 inch mold cavity. The molded sheets were annealed at 280° F. for 15 minutes.

Flame properties of the polyester flame retardant compositions were determined according to the American Society for Testing Material, D-2863-70. Sample size was 0.07" x 0.5" x 2.5-5.0". Self-adhering glass tape (3M Company, Scotch Brand, glass electrical tape, No. 27; manufactured under U.S. Pat. 3,115,246) was applied to one side of the test specimen which prevented bowing during burning.

The effects of flame retardant concentrations other than those in the melt blends listed above were also determined. These samples prepared by dry blending in a mortar and pestle (a) polyester-flame retardant concentrate with unmodified polyester powder or (b) neat flame retardant with unmodified polyester powder. The variation in flame properties with flame retardant concentration is shown in Table IV below:

TABLE IV

| Flame retardant | Blending method | LOI [a] |
|---|---|---|
| None | | 25.8 |
| 4% I | Concentrate | 28.3 |
| 8% Ia | Hot melt | 31.7 |
| 8% Ia | Concentrate | 31.7 |
| 8% Ia | Neat | 31.7 |
| 16% Ia | Concentrate | 35.8 |
| 20% Ia | do | 32.5 |
| 24% Ia | Hot melt | 33.9 |
| 4% IIa | Concentrate | 29.2 |
| 8% IIa | do | 32.5 |
| 8% IIa | Neat | 30.7 |
| 16% IIa | Concentrate | 34.2 |
| 20% IIa | do | 33.3 |
| 24% IIa | do | 34.2 |
| 8% IId | Hot melt | 28.3 |

[a] LOI=limiting oxygen index. Flame resistance increases with increasing LOI value.

The rapid increase in flame resistance with increasing concentration of flame retardants Ia and IIa up to about 16% is clearly shown. The flame resistance of a given polyester composition was generally independent of the blending technique. The flame properties of polyethylene terephthalate containing 8% of other compounds of invention are shown in Table VII.

RETENTION OF FLAME RETARDANT

One gram of finely ground polyester, flame retardant composition was stirred with 200 g. of water containing 1.2 g. of nonionic laundry detergent at varied temperature-time intervals to determine extractability of flame retardant. The detergent composition was as follows:

10.0 pts.—alkylphenoxypoly(ethyleneoxy)ethanol
5.0 pts.—sodium dodecylbenzene sulfonate
35.0 pts.—sodium tripolyphosphate
10.0 pts.—borax
5.0 pts.—sodium meta silicate
33.5 pts.—sodium carbonate Extraction results are shown in Table V.

Excellent resistance to extraction was observed under all conditions except boiling. Twenty hours at 60° C. exposure approximates the conditions for 50 cycles of home laundering. The apparent negligible effect of particle size on retention of flame retardant was surprising.

TABLE V

Retention of flame retardants effect of particle size on extraction

| Polyester, flame retardant composition | Average particle size, μ | Time, hours | Temperature, °C. | Percent FR agent [a] retained |
|---|---|---|---|---|
| IVa | 271 | 4 | 60 | 95.4 |
| | 127 | 4 | 60 | 92.5 |
| | 105 | 4 | 60 | 96.5 |
| IVc | 291 | 4 | 60 | 87.8 |
| | 129 | 4 | 60 | 87.5 |
| | 105 | 4 | 60 | 92.6 |

Effect of extraction time at 60° C.

| | | | | |
|---|---|---|---|---|
| IVa | 127 | 4 | 60 | 92.5 |
| | 127 | 20 | 60 | 86.5 |
| IVc | 127 | 4 | 60 | 87.5 |
| | 127 | 20 | 60 | 88.5 |

Effect of extraction temperature

| | | | | |
|---|---|---|---|---|
| IVa | 127 | 4 | 60 | 92.5 |
| | 127 | 4 | 100 | 52.4 |
| IVc | 127 | 4 | 60 | 87.5 |
| | 127 | 4 | 100 | 49.6 |

[a] Retention based on elemental phosphorus analysis.

EXAMPLE V

Melt blends of polycarboxamide, (Nylon 66 type; Vicat softening point of 518° F. by ASTM D-1525) and flame retardants were prepared in a similar manner as described in Example IV. Some discoloration of polymer-flame retardant composition was observed because of localized overheating owing to insufficient stirring of the extremely high melt viscosity at 280–310° C. Hot melt blends prepared in an injection molder with more uniform temperature and mixing control showed little or no polymer degradation or discoloration.

Test specimen were prepared and flame tested according to the procedure of Example IV. The results are shown in Table VI.

The excellent flame retarding properties shown in Table VI by the compounds of invention were further demonstrated using a second flame test method. Sheets were prepared as described above from neat flame retardant-Nylon 66 blends at 4 and 8% flame retardant levels.

TABLE VI

Effect of flame retardants on Nylon 66 properties

| Percent flame retardant | Blending method | LOI |
|---|---|---|
| None | | 23.3–24.2 |
| 8% Ia | Concentrate | 26.7 |
| 16% Ia | do | 28.3 |
| 24% Ia | do | 30.0 |
| 8% Ib | Neat | 28.0 |
| 12% Ib | do | 31.1 |
| 4% IIa | Concentrate | 25.8 |
| 8% IIa | do | 26.7 |
| 16% IIa | do | 27.5 |
| 20% IIa | do | 29.2 |
| 24% IIa | do | 29.2 |

The flame properties of each composition were determined by the critical angle test according to the procedure described below.

Three or more 0.07" x 0.25" x 2" samples were die cut from the pressed sheet. One end of the sample was placed in a single clamp in such a manner that the free end could be ignited with a paper match. Samples of each composition were tested in one or more of the positions as defined below:

| Position | Path of flame propagation after ignition of free end |
|---|---|
| 0° | Downward and 90° to horizontal. |
| 45° | Downward at 45° to horizontal. |
| 90° | Horizontal. |
| 135° | Upward at 45° to horizontal. |
| 180° | Upward at 90° to horizontal. |

The flame was applied to the free end until ignition of sample was observed (usually about 5 sec.) and removed. If the flame progressed to the clamp, the sample was considered non-self-extinguishing (NSE) in that position. If the sample was self extinguishing before the flame reached the clamp, the flame was applied for a second ignition. If the sample was SE before reaching the clamp after the second ignition it was considered SE in that position.

Generally, the first sample of each film composition was tested in the 90° position. If it was found to be NSE at 90°, additional samples were tested sequentially in the 45°, and 0° positions. If the second sample was SE at 45°, this was considered the maximum angle whereby the sample would be found SE and recorded as such. If however, the first sample tested in the 90° position was found to be SE, additional samples were tested sequentially in the 135° and 180° positions. For clarification of flame properties ratings in Table VII, the table below relates flame properties as assessed in individual positions and overall rating.

| Positions tested (performance) | Overall rating |
|---|---|
| 90°(NSE), 45°(SE) | 45 |
| 90°(NSE), 45°(NSE), 0°(SE) | 0 |
| 90°(NSE), 45°(NSE), 0°(NSE) | NSE |
| 90°(SE), 135°(SE), 180°(SE) | 180 |
| 90°(SE), 135°(SE), 180°(NSE) | 135 |
| 90°(SE), 135°(NSE) | 90 |

It is to be understood that flame resistance varied proportionately to the numerical value assigned for the overall rating (corresponding to the position as defined above).

The flame properties of Nylon 66, flame retardant compositions are shown in Table VII. Compounds of invention greatly improved the flame resistance of Nylon 66 at concentrations of 4 and 8%.

EXAMPLE VI

Phosphorus compounds shown in Tables I–III were added to a 10% solution of acetate rayon in acetone in quantities equal to 4 and 8% of the total weight of acetate rayon and phosphorus compound. Films were cast from the resulting solution, air dried for about one hour and conditioned at 73° F., 50% relative humidity for at least 24 hours before flame testing. Film thickness was approximately 1 mil.

The flame properties of each film was determined according to the critical angle test of Example V except sample preparation. Three or more 0.5" x 2" strips were cut from each film composition. The film strip was folded with creasing along the 2" axis to form a "V" shape (end view) whereby each side of the "V" was approximately 90°. One end of the test specimen was placed in a clamp. Flame testing and rating was identical to the procedure of Example V. Only 1–2 seconds exposure to the flame was required to ignite the thin film sample.

The excellent flame resistance of acetate rayon films containing 8% of most compounds of invention is shown in Table VII.

EXAMPLE VII

Polyacrylonitrile and polystyrene flame retardant compositions were prepared according to the procedure of Example VI. The flame retardants were dissolved in 10% solution of polyacrylonitrile and polystyrene in dimethyl formamide and ethylene chloride, respectively. Polyacrylonitrile films were dried for 20 minutes in a forced draft oven at 105–110° C., stripped and heated for an additional hour at 105° C. Polystyrene films were dried at 50° C. for 45 minutes. All films were conditioned at 73° F, 50% relatve humidity for 24 hours before flame testing according to the procedure of Example VI.

The flame test results are listed in Table VII. Significant improvements in flame properties of both polyacrylonitrile and polystyrene was obtained by most of the compounds of invention at the 16% level.

In Table VII, the segment of the structural formulae shown as $$-\overset{|}{\underset{|}{C}}(CH_2O)_2\overset{O}{\underset{\|}{P}}-$$

is used as a "shorthand" designation of the segment $$-C\begin{matrix}\diagup CH_2O \diagdown \\ \diagdown CH_2O \diagup\end{matrix}\overset{O}{\underset{\|}{P}}-$$

as shown elsewhere in the specification.

TABLE VII

Flame Properties of Various Polymer, Flame Retardant Compositions and Flame Retardant Additive Evaluations

| | | | 8% flame retardant concentration [a] | | | |
|---|---|---|---|---|---|---|
| | | | | Flame rating in critical angle test | | |
| Compound number | Structure | Δ LOI [b] polyester | Nylon 66 | Acetate rayon | Polyacrylonitrile [c] | Polystyrene [c] |
| | No additive | 0 | 45 | NSE | NSE | NSE |
| I | 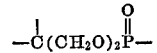 $CH_3O\overset{O}{\underset{\|}{P}}OCH_2\overset{Et}{\underset{|}{C}}(CH_2O)_2\overset{O}{\underset{\|}{P}}CH_3$ $\quad\quad\quad\quad\quad\quad\quad\underset{|}{CH_3}$ | 6.7 | [d] 180 | [d] 180 | 90 | 45 |
| Ia | 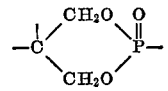 $CH_3\overset{O}{\underset{\|}{P}}\left[OCH_2\overset{Et}{\underset{|}{C}}(CH_2O)_2\overset{O}{\underset{\|}{P}}CH_3\right]_2$ | 5.9 | [d] 180 | [d] 180 | 0 | 180 |

Footnotes at end of table.

TABLE VII—Continued

| Compound number | Structure | Δ LOI[b] polyester | 8% flame retardant concentration[a] — Flame rating in critical angle test |||||
|---|---|---|---|---|---|---|
| | | | Nylon 66 | Acetate rayon | Polyacrylonitrile[c] | Polystyrene[c] |
| Ib | Mixture I and Ia | 4.2 | [e]ND | [d]180 | 90 | 45 |
| Ie | $CH_3\overset{O}{\overset{\|}{P}}[OCH_2\overset{Me}{\overset{\|}{C}}(CH_2O)_2\overset{O}{\overset{\|}{P}}CH_3]_2$ | 3.4 | [d]180 | 135 | 90 | 90 |
| If | $CH_3CH_2\overset{O}{\overset{\|}{P}}[OCH_2\overset{Et}{\overset{\|}{C}}(CH_2O)_2\overset{O}{\overset{\|}{P}}CH_2CH_3]_2$ | 3.4 | [d]180 | 180 | 45 | 45 |
| Ig | $CH_3CH_2CH_2CH_2\overset{O}{\overset{\|}{P}}[OCH_2\overset{Et}{\overset{\|}{C}}(CH_2O)_2\overset{O}{\overset{\|}{P}}CH_2CH_2CH_2CH_3]_2$ | 4.2 | [d]180 | NSE | 45 | 45 |
| Ih | $(CH_3O)_2\overset{O}{\overset{\|}{P}}OCH_2\overset{Et}{\overset{\|}{C}}(CH_2O)_2\overset{O}{\overset{\|}{P}}CH_3$ | 5.9 | [d]180 | 180 | 45 | 45 |
| Ii | $\overset{O}{\overset{\|}{P}}[OCH_2\overset{Et}{\overset{\|}{C}}(CH_2O)_2\overset{O}{\overset{\|}{P}}CH_3]_3$ | 5.9 | ([d]) | 45 | 0 | 45 |
| Ij | $\overset{O}{\overset{\|}{P}}[OCH_2\overset{Et}{\overset{\|}{C}}(CH_2O)_2\overset{O}{\overset{\|}{P}}CH_2CH_3]_3$ | 2.5 | [d]180 | 135 | 45 | 45 |
| Ik | $[\phi O]_2\overset{O}{\overset{\|}{P}}OCH_2\overset{Et}{\overset{\|}{C}}(CH_2O)_2\overset{O}{\overset{\|}{P}}CH_3$ | 4.2 | 180 | 135 | NSE | 45 |
| Il | $CH_3O\overset{O}{\overset{\|}{C}}\text{—}\phi\text{—}\overset{O}{\overset{\|}{C}}OCH_2\overset{Et}{\overset{\|}{C}}(CH_2O)_2\overset{O}{\overset{\|}{P}}CH_3$ | 1.7 | [d]180 | ND | ND | ND |
| IIa | $p\text{-}\phi[\overset{O}{\overset{\|}{C}}OCH_2\overset{Et}{\overset{\|}{C}}(CH_2O)_2\overset{O}{\overset{\|}{P}}CH_3]_2$ | 4.2 | [d]180 | 135 | NSE | 45 |
| IIc | $p\text{-}\phi[\overset{O}{\overset{\|}{C}}OCH_2\overset{Me}{\overset{\|}{C}}(CH_2O)_2\overset{O}{\overset{\|}{P}}CH_3]_2$ | 3.4 | 180 | [f]INS | 0 | 45 |
| IId | $o\text{-}\phi[\overset{O}{\overset{\|}{C}}OCH_2\overset{Et}{\overset{\|}{C}}(CH_2O)_2\overset{O}{\overset{\|}{P}}OCH_3]_2$ | 4.2 | [d]180 | 45 | NSE | 45 |
| IIe | $CH_3\overset{O}{\overset{\|}{P}}(OCH_2)_2\overset{Et}{\overset{\|}{C}}CH_2O\overset{O}{\overset{\|}{C}}CH=CH\overset{O}{\overset{\|}{C}}OCH_2\overset{Et}{\overset{\|}{C}}(CH_2O)_2\overset{O}{\overset{\|}{P}}CH_3$ | 4.2 | [d]180 | INS | 0 | 45 |
| IIf | $CH_3\overset{O}{\overset{\|}{P}}(OCH_2)_2\overset{Et}{\overset{\|}{C}}CH_2O\overset{OO}{\overset{\|\|}{CC}}OCH_2\overset{Et}{\overset{\|}{C}}(CH_2O)_2\overset{O}{\overset{\|}{P}}CH_3$ | 2.5 | [d]180 | 90 | 0 | 45 |
| IIg | $CH_3\overset{O}{\overset{\|}{P}}(OCH_2)_2\overset{Et}{\overset{\|}{C}}CH_2O\overset{O}{\overset{\|}{C}}\text{—}\underset{Cl\;Cl}{\overset{Cl\;Cl}{\phi}}\text{—}\overset{O}{\overset{\|}{C}}OCH_2\overset{Et}{\overset{\|}{C}}(CH_2O)_2\overset{O}{\overset{\|}{P}}CH_3$ | 3.4 | [d]180 | INS | 45 | INS |
| IIh | $p\text{-}\phi[\overset{O}{\overset{\|}{C}}OCH_2\overset{Et}{\overset{\|}{C}}(CH_2O)_2\overset{O}{\overset{\|}{P}}CH_2CH_2OH]_2$ | 1.7 | [d]180 | INS | NSE | INS |
| IIi | $CH_3\overset{O}{\overset{\|}{P}}(OCH_2)_2\overset{Et}{\overset{\|}{C}}CH_2O\overset{O}{\overset{\|}{C}}(CH_2)_4\overset{O}{\overset{\|}{C}}OCH_2\overset{Et}{\overset{\|}{C}}(CH_2O)_2\overset{O}{\overset{\|}{P}}CH_3$ | 4.2 | [d]180 | 135 | 0 | 45 |
| IIj | $\phi(\text{Br})\text{—}\overset{O}{\overset{\|}{C}}OCH_2\overset{Et}{\overset{\|}{C}}(CH_2O)_2\overset{O}{\overset{\|}{P}}CH_3$ | 3.4 | [d]180 | 90 | 0 | 45 |
| IIk | $Br\text{—}\phi\text{—}\overset{O}{\overset{\|}{C}}OCH_2\overset{Et}{\overset{\|}{C}}(CH_2O)_2\overset{O}{\overset{\|}{P}}CH_3$ | 4.2 | [d]180 | 90 | NSE | 45 |
| IIl | $\phi(\text{Cl})\text{—}\overset{O}{\overset{\|}{C}}OCH_2\overset{Et}{\overset{\|}{C}}(CH_2O)_2\overset{O}{\overset{\|}{P}}CH_3$ | 4.2 | [d]180 | 45 | NSE | 45 |
| IIm | $\phi(\text{OH})\text{—}\overset{O}{\overset{\|}{C}}OCH_2\overset{Et}{\overset{\|}{C}}(CH_2O)_2\overset{O}{\overset{\|}{P}}CH_3$ | 4.2 | [d]180 | 90 | NSE | 45 |
| III | $CH_3\text{—}\phi\text{—}SO_2OCH_2\overset{Et}{\overset{\|}{C}}(CH_2O)_2\overset{O}{\overset{\|}{P}}CH_3$ | 3.4 | [d]180 | 135 | 45 | 45 |
| IIIa | $CH_3\text{—}\phi\text{—}SO_2OCH_2\overset{Et}{\overset{\|}{C}}(CH_2O)_2PCH_2CH_3$ | 3.4 | 0 | 135 | 45 | 90 |

[a] Flame retardant concentration of 8% unless noted. [b] LOI value over control sample. [c] Flame retardant concentration of 16%. [d] Flame retardant at 4% level also gave 180 rating. [e] Not determined. [f] Insoluble in polymer solution.

EXAMPLE VIII

Flexible polyurethane foams were prepared from the recipes as shown below:

| Ingredients, parts | Formulation | | |
|---|---|---|---|
| | (a) | (b) | (c) |
| Toluene diisocyanoate (TDI) | 135.4 | 135.4 | 35.4 |
| Polyether triol (M.W. approximate 3,000) | 300 | 300 | 300 |
| Compound 1 | 0.0 | 12.9 | 21.6 |
| Silicone oil surfactant | 1.0 | 1.0 | 1.0 |
| Stannous octoate | 0.9 | 0.9 | 0.9 |
| N,N''-dimethyl ethanolamide | 1.2 | 1.2 | 1.2 |
| Water | 10.6 | 10.6 | 10.6 |

In each case, all ingredients except toluene diisocyanate (80% 2,4-isomer; 20% 2,6-isomer) were blended at room temperature. The diisocyanate was then added, mixed vigorously for about 12 seconds and the mixture was poured into a cardboard box and allowed to foam. After full rise had occurred, the foam was placed in an oven at 120° C. for 30 minutes. After removing to crush closed cells by mechanical compression, the foam was heated for an additional 2 hours at 120° C.

The flame properties of the polyurethane compositions were determined by ASTM D–1692–59T. Foam density and flame test results are summarized below:

| Foam composition | a | b | c |
|---|---|---|---|
| Density, lbs./ft.³ | 1.93 | 1.87 | 1.82 |
| SE time, seconds* | NSE | 34 | 11 |
| Total distance burned, in | <6 | 2.51 | 1.44 |

* Time elapsed after reached one-inch mark before flame was self extinguished.

EXAMPLE IX

A rigid polyurethane foam was prepared by blending 256 parts of a sucrose polyether polyol, hydroxyl number of 410 mg. KOH/gm., 4.0 parts of a silicone oil surfactant, 4.0 parts of N,N,N',N'-tetramethylbutane-1,3-diamine, 90.0 parts of trichlorofluoromethane and 25.0 parts of Compound 1. 250 parts of the polymethylene polyphenyl isocyanate was then added, followed by vigorously mixing. At the onset of foaming, the mixture was poured into a cardboard box and allowed to rise and cure at room temperature. A foam was obtained having a density of 1.79 pounds per cubic foot.

The polymethylene polyphenylisocyanate used above is a mixture represented by the formula:

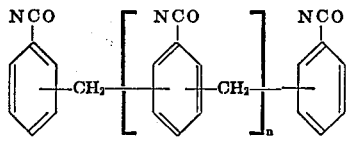

where $n$ ranges from 0–2 and averages 0.6.

Additional foams were prepared in a similar manner using the calculated quantities of compounds I, Ia and IIa to provide 1.0 and 1.5% phosphorus in the formulation excluding the weight of trichlorofluoromethane. The trichlorofluoromethane was adjusted to 14.0% in each composition to provide a constant density of about 1.8 pounds per cubic ft.

The flame properties as measured by ASTM–D–1692–59T of the above foams and a control foam of identical formulation without flame retardant are shown below:

| Percent flame retardant (percent P) | Rating by ASTM D-692-59T | Total distance burned, inches |
|---|---|---|
| None | Burning | 6.0 |
| 4.7% I (1.0% P) | Self-extinguishing | 0.81 |
| 7.0% I (1.5% P) | Non-burning | 0.59 |
| 4.8% Ia (1.0% P) | Self-extinguishing | 1.3 |
| 7.2% Ia (1.5% P) | Non-burning | 0.75 |
| 8.5% IIa (1.0% P) | Self-extinguishing | 1.75 |

The above results show the high flame retardant efficacy of compounds of invention, especially Compound I.

The flame retardant addition compounds are effective at flame retardant concentrations in polymers, including polyethylene terephthalate, polycarboxyamide, polyacrylonitrile, acetate rayon, polystyrene, rigid polyurethanes and flexible polyurethanes. They will also be effective in combinations with polymeric materials such as cotton, cellulose, paper and silk; cellulose esters and ethers such as cellulose acetate butyrate and ethyl cellulose; polyvinyl chloride; polymethyl methacrylate; phenol aldehyde resins, urea resins, epoxy resins; linear and cross-linked polyester; and maleic anhydride heteropolymers. Flame retardant concentrations can vary dependent upon the polymer used. In general, they will be 2 to 30 percent, preferably 4 to 16 percent, based upon the weight of the total composition.

One or more of the addition compounds can be incorporated into the polymer during the polymerization step or by admixing with the polymer prior to or during milling, extrusion, spinning, foaming, pressing or other conventional operations for forming or applying the polymeric end-product.

The physical form of the flame retardant composition can vary widely. While textile fibers are of major interest, films, coatings, sheets, rods, boards, foams and the like can be used. Excellent retention of flame resistance is achieved by distributing the flame retardant throughout polyester. Non-uniform distribution of the flame retardant into a formed polymer such as fibers can also be advantageous.

The flame retardants of this invention may be used in combination with known flame retardants. Compounds have free —CH₂OH or —CH₂CH₂OH groups may be used in a manner to become an integral part of a polymer such as polyesters or polyurethanes.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A polymer composition containing a flame retardant amount of at least one compound set forth by the formulae:

(A) 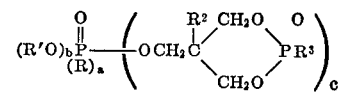

where $a$ is 0 or 1; $b$ is 0, 1 or 2, $c$ is 1, 2, or 3 and $a+b+c$ is 3; R and R' are the same or dissimilar and are alkyl ($C_1$–$C_8$), phenyl, halophenyl, hydroxyphenyl, tolyl, xylyl, benzyl, phenethyl, hydroxyethyl, phenoxyethyl, or dibromophenoxymethyl; $R^2$ is alkyl ($C_1$–$C_4$); and $R^3$ is lower alkyl ($C_1$–$C_4$) or hydroxyalkyl ($C_1$–$C_4$) and (B) 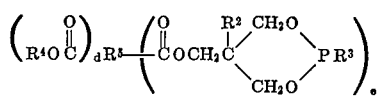

where $d$ is 0, 1 or 2; $e$ is 1, 2 or 3; $R^2$ is alkyl ($C_1$–$C_4$); $R^3$ is lower alkyl ($C_1$–$C_4$) or hydroxyalkyl ($C_1$–$C_4$); $R^4$ is alkyl ($C_1$–$C_4$) phenyl, halophenyl, hydroxyphenyl, hydroxyethyl, phenoxyethyl, dibromophenoxyethyl, tolyl, xylyl, benzyl, or phenethyl; and $R^5$ is monovalent alkyl ($C_1$–$C_6$), chlorophenyl, bromophenyl, dibromophenyl, tribromophenyl, hydroxyphenyl, naphthyl, tolyl, xylyl, benzyl, or phenethyl; divalent alkylene ($C_1$–$C_6$), vinylene, o-phenylene, m-phenylene, p-phenylene, tetrachlorophenylene (o, m, or p), or tetrabromophenylene (o, m, or p); or trivalent phenenyl.

2. A polymer composition of claim 1, wherein said compound has the formula:

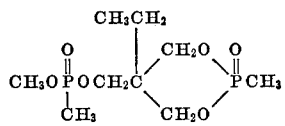

3. A polymer composition of claim 1, wherein said compound has the formula:

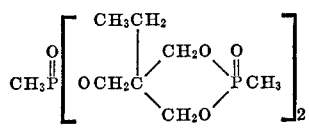

4. A polymer composition of claim 1, wherein said compound has the formula:

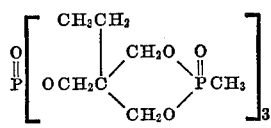

5. A polymer composition of claim 1, wherein said compound has the formula:

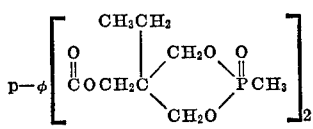

6. A polymer composition of claim 1, wherein said compound has the formula:

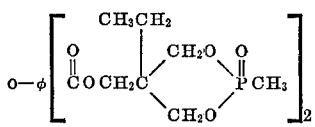

7. A polymer composition of claim 1, wherein said compound has the formula:

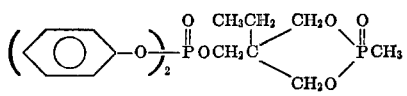

References Cited
UNITED STATES PATENTS

| | | | |
|---|---|---|---|
| 3,526,613 | 9/1970 | Reese et al. | 260—937 |
| 3,033,887 | 5/1962 | Wadsworth Jr., et al. | 260—973 |
| 2,643,261 | 6/1953 | Matuszak et al. | 260—937 |
| 3,660,314 | 5/1972 | Vandenberg | 260—45.7 |

MAURICE L. WELSH, Primary Examiner

E. C. RZUCIDLO, Assistant Examiner

U.S. Cl. X.R.

260—2.5 AJ, 927 R, 937, 939

UNITED STATES PATENT AND TRADEMARK OFFICE
CERTIFICATE OF CORRECTION

PATENT NO. : 3,849,368
DATED : November 19, 1974
INVENTOR(S) : James J. Anderson, Vasco G. Camacho and Robert E. Kinney It is certified that error appears in the above-identified patent and that said Letters Patent are hereby corrected as shown below:

| | |
|---|---|
| Col. 2, line 3 | "alkarylox" should be --alkaryloxy--. |
| Col. 2, line 65 | "inventio nmay" should be --invention may--. |
| Col. 4, line 24 | ".025" should be --.205--. |
| Col. 5, line 26 | "hearing" should be --Heating--. |
| Col. 7 Table 1, Structure IA | "PCH$_3$" should be -$\overset{\overset{O}{\|\|}}{P}$CH$_3$--. |
| Col. 19, Example VIII line 31, | "after reached" should be --after flame reached--. |
| Claim 1, line 56 | "dibromophenoxymethyl" should be --dibromophenoxyethyl--. |
| Claim 1, line 67 | "(C$_1$-C$_4$)" should be -(C$_1$-C$_8$),--. |

Signed and sealed this 15th day of July 1975.

(SEAL)
Attest:

RUTH C. MASON
Attesting Officer

C. MARSHALL DANN
Commissioner of Patents
and Trademarks